Dec. 9, 1969  P. ANDREWS  3,482,642
SURFACE, MATERIAL AND HEALTH PROTECTIVE DEVICE
Original Filed June 17, 1963

INVENTOR.
Peter Andrews

United States Patent Office 3,482,642
Patented Dec. 9, 1969

3,482,642
SURFACE, MATERIAL AND HEALTH
PROTECTIVE DEVICE
Peter Andrews, 190 Gebhardt Road,
Penfield, N.Y. 14526
Continuation of application Ser. No. 508,626, Oct. 21,
1965, which is a division of application Ser. No.
288,159, June 17, 1963. This application Nov. 22, 1966,
Ser. No. 604,512
The portion of the term of the patent subsequent to
May 2, 1985, has been disclaimed
Int. Cl. B62d 25/20
U.S. Cl. 180—69.1                                    20 Claims

ABSTRACT OF THE DISCLOSURE

A process for increasing the rate of oxidation and thickening of fluid or oil which had dripped and is retained in a receptacle, which is in secured association to and under a motor vehicle, for example, a car, bus, truck and the like. The disclosed process substantially utilizes a generated draft of air generated by the forward drive motion of the vehicle and catalyst means for thickening and reducing the captured fluids volume in the receptacle. The generated draft of air also indirectly cooling the oil in the crankcase oil pan sump, depending on the receptacle's location under the motor vehicle.

Another portion of this disclosure being for a uniquely constructed combination apparatus device employing a venturi tube-like draft of air principle and the above process, for example, in one of its many applications being performed in the receptacle, fluid or oil which dripped therein, portion of the combination device.

---

This is a continuation application of application Ser. No. 508,626 filed Oct. 21, 1965, now abandoned, which is a division of application Ser. No. 288,159 filed June 17, 1963, now abandoned.

This invention relates substantially to a surface, material and health protective combination device whereby substantially lives are saved on motor vehicle highways by having safer driving conditions, and also preventing accidents on the highways, and cleaner air, cleaner and neater appearance of motor vehicular used surfaces and like more fully described in this specification.

This combination device is used in operative association with automotive and/or motor vehicles to catch and retain the fluid which leaks or drips from, on or in said vehicle, to prevent the surface or material which is substantially around and under the leaking or dripping fluid from becoming a disgustful sight, polluted, slippery, contaminated or impaired by said fluid. This device generally prevents pollution of the air we breathe and also protects the air from becoming noxious by hydrocarbons which are mostly in petroleum lubricating fluids that are presently dripping from said vehicles. The hydrocarbons in the dripped fluid oxidize, when exposed to sunlight, making them noxious whenever the fluid is on a heated surface such as sun heated surfaces of toll areas, streets, highways, parking areas, or any such motor vehicle used surface.

The prior art discloses various drip pans, trampoline type drip devices, shelf or hinged trap door and the like devices that have previously been constructed to retain oil drippings under automobiles, trucks or busses.

None that I am aware of have adapted or removably secured a venturi tube-like oil drip pan device under a monorail or said motor vehicle. None that I am aware of have attempted to positively retain and oxidize the dripped fluid in their drip catching device. None that I am aware of have tried to heat the retained fluid to increase its rate of oxidation and thickening. None that I am aware of use a venturi tube-like principle for creating a draught of air over the retained fluid, and which draft of air substantially flows in the same direction as is the forward motor vehicle drive motion.

Three prior art devices capture the dripped fluid and then eject or dump it onto another portion of a highway or motor vehicle traveled surface, which is just what should not and should be prevented from being done.

This device or any portion thereof may be fixed, welded, soldered, banded, removably secured, releasably attached, or releasably locked, to, in, or on a motor vehicle before or after the dripping fluid starts to leak or drip.

This device is securedly associated, and is in secured combination with a motor vehicle and thereby is considered as being a part of the motor vehicle.

A motor vehicle is here disclosed as being a vehicle which travels or is parked on the surface or material of a street, road, highway, floor, inside of garages, buildings, warehouses, factories, raceways, airport areas, and the like being any three or more wheeled motor vehicle having wheels or tires.

Also a monorail type of motor vehicle is the type which travels on two rails and another type that travels on a single rail which is supported by trestles.

The term "device," in this specification, represents this venturi tube-like surface, material and health protective device.

The device is constructed so that a generated flow of air is at least over its inside fluid retentive area, or over, through and out of the material, cover, screen and the like that is retained inside said device.

The term "fluid" is used in this specification and the claims to designate oil or grease, mineral and non-mineral and synthetic lubricants.

The term, "bell housing," is to mean or designate a clutch housing, transmission case, converter case, flywheel case and the like, which is the large dome-like shaped member that is located just back of the motor and in front of the transmission case or gear box or just back of the crankcase.

The device can be disposable in whole or in part, as deemed desirable or necessary by the manufacturer, depending on the device, its structure, or its application.

A very important object of this invention or device is to prevent the surface or material which is under a motor vehicle, from becoming a disgustful sight, polluted, contaminated or impaired.

Another important object of this invention is to increase the rate of oxidation and the thickening of the fluid in the material, which is retained in the fluid retaining receptacle portion of said device, by allowing and providing for a draught of air, which is generated during motor vehicular drive to at least flow over the retained material.

Yet another important object of this venturi tube-like invention is to increase the rate of oxidation and thickening of the fluid retained in the device by catalyzed oxidation and/or the draught of air over the fluid in the device. This action supplies the fluid, which is catalyzed, with oxygen to increase the rate of oxidation and thickening of the fluid and also to cary off the fumes which are over said fluid. The force or draught of air will not spill, dump or eject the thickened and oxidixed fluid onto the surface or material under the driven motor vehicle.

A still yet another important object of this invention is to provide place or imbue a catalytic chemical or a catalyst into or onto a material, or the material retained in the device, or place a catalytic chemical bed or a catalyst means on the inside of the receptacle surface and thereby be actually under said material, for further increasing the rate of oxidation and thickening of the fluid in said material, which material is retained in this device. This material is disopsable, cleanable, rechargeable with said catalyst or the like as deemed necessary or desirable. The spilling, dumping of the fluid would be eliminated and reduction of the fluid volume and thickening thereof would thereby also be obtained.

A further object of this invention is to have a bed of catalyst or bed of catalytic chemicals on a stand-off or on part of the device, to oxidize hydrocarbons as they pass past or against said bed, when hydrocarbon fumes are in the draught of air, which is flowing over the device. The catalyst or catalytic chemical bed can also be in the device without any retained material over or in the device if deemed desirable. The bed of catalyst or catalytic chemicals also will prevent the air from becoming polluted or contaminated by oxidizing the hydrocarbons from the receptacle retained fluid.

Another object of this invention is to provide a device which has retained in the pan or receptacle portion of the device, a material or a combination of materials, which are characterized by being, absorbent, re-absorbent, absorbent, reabsorbent, or possess retentivity, be osmotic, foam, permeable, fibrous, impermeable, open cell foam, closed cell foam, cellulosic, cellular, foamed, vacular, foamed in place, non-absorbent (plastic, metal, man-made fibers, wiskers, crimped, corrugated, honeycomb, and the like) material, to prevent the accumulated dripped in fluid therein from spilling out, being dumped out, or be ejected out of the device and onto the pavement, road, highway, driveway, garage, toll areas, parking areas, streets and the like when the vehicle is stopped or started abruptly or when said vehicle is in fast drive, then the flow of air thereover is, draughting, very swiftly but said air will not eject the fluid therefrom and onto a surface below.

A still other object of my invention is to proivde a device which is or is the equivalent of a one-piece structure and is adapted or removably secured to the vehicle in at least one or more places and which is of a safe, solid, cheap structure and at the same time, the securing to the motor vehicle is accomplished without drilling any holes, adding more supports, or without using any bolts or means for adapting or removably securing the deivce to the vehicle other than what is presently on or in the vehicle and yet make the device readily removable for maintenance of the vehicle or of the device.

A principal object of this invention is to save money for home owners who have a fluid leaking or dripping automobile, truck, jeep, truckster and the like. When the fluid leaks on the driveway or the garage floor, a puddle of dirty gooey, sticky fluid is thereon, into which a person or child could step into or a baby could crawl into, thereby the clothing, the shoes, the floor in the house, the rug in the house, and the like, are soiled or impaired. This impairing is a monetary loss as well as having a child or baby soiled or messy. The device prevents the leaking fluids from creating unsightly dirty spots on paved driveways, or garage floors, on the surfaces of clean public areas, clean private areas, sacred areas, clean commercial areas, clean municipal areas, and the like.

Another principal object of this invention is to provide a device whereby neighbors and friends will welcome you to visit them and still be welcomed at another time. If you should visit them and then leave a fluid puddle on the driveway surface, especially if the driveway is in new condition, your neighbor or friends will not welcome you back because of the mess you left behind.

A yet another object of this invention is to retain the present cooling surface of the crankcase oil pan sump. The cooling of the crankcase oil pan sump by a draught of air, which is generated during drive, keeps the lubricating fluid, therein, cool and retards the oxidation rate and the thickening of the fluid which is necessary for proper lubrication of the internal motor vehicle parts.

A yet another important object of this invention is to protect or shield the crankcase oil pan sump from hot surfaces or pavements thereunder that would thereby add additional heat to the lubricating fluid in said oil pan, and thereby the rate of oxidation and thickening of the said fluid is retarded and proper lubrication is maintained as well as retaining the leaking fluid in the device which is adapted or removably secured to the motor vehicle.

Still another principal object of my invention is to save money for automobile, truck, bus and the like owners, which have a leaky seal at the rear of the engine or in the transmission or in both of them. The cost of a device is only a fraction of the cost to replace the seal in the motor and in the transmission. It will cost from thirty to forty-five dollars, for labor, just to replace a seventy-five cent seal in the automatic transmission alone and the device could be as cheap as two or three dollars with installation. Thereby the owners have a savings of at least ten to one and about a twenty to one savings if the rear engine seal is to be replaced also.

A still further object of this invention is to save money for the state, parking garage owners, cities, towns, federal government and the like by preventing the pollution, contamination, or impairment of the surfaces or material on thruways, bridges, highways, toll collecting areas, collecting stations, gasoline stations, garages, warehouses, storage areas, parking areas, streets, freeways, turnpikes, and the like which are being cleaned with surface improving machines, surface cleaning machines or cleaning with detergents, soaps and the like. The state alone is presently paying thousands of dollars to clean the thruway areas and toll coolecting areas and thereby millions of dollars could be saved for all concerned.

Another principal object of this invention is to provide a device, which is adapted or removably secured to the underside of said motor vehicles which would thereby prevent the surface of, streets, roads, highways, thruways, toll areas, collecting stations, bridge, vehicle traveled, surface, turnpikes, freeways, and the like from becoming contaminated by the dripping fluid, which leaks from gasketed, sealed or past shaft seals or joints and said leaking fluid is contaminating, polluting, and impairing said motor vehicle traveled surfaces. The motor vehicle dripping fluid is creating a slippery, dangerous surface onto which motor vehicular traveling is becoming more and more crowded or conjested. The more crowded or conjested the said traveled surfaces are then the more the damaging fluid drippings are going to be, even more so, a very objectionable condition. The disclosed traveling conditions are thereby, going to be also compounded, and the appearance of the traveled surfaces even more so going to be objectioanble, not to mention the following safety hazard. Moisture, dew, and especially rain or surface water will, when added to the dripping or leaking fluid slippery surface, raise or lift a portion of said slimy leaked fluid onto its surface and thereby tends to spread or float the said fluid even more so, especially from the center portion of the traveled surfaces, where the said fluid contamination and the like, is black with the slimy, slippery mess. The moisture, dew and/or water thereby, spreads the dripped fluid or oil slick onto the somewhat cleaner portion of the traveled surfaces and creates an even more dangerous motor vehicular surface upon which to travel thereon.

An additional principal object of this invention is to provide friendly relations between customers and commercial owned, fluid dripping motor vehicle owners or the drivers thereof. Trucks, insurance men, salesmen and the like, which deliver milk, freight, packages, material, lumber, fuel oil, collect payments, sell goods or material and the like, are not welcomed on any driveway, that is paved and/or covered, or on clean streets because they always leave a fluid spot or puddle when they leave. Some customers insist that said leaking vehicles stay off their driveways and make the drivers walk to the house from the street. This situation would never be necessary if said vehicle was equipped or had a said fluid retaining device, adapted or removably secured to the underside of said vehicles, whereby the leaking fluid would be retained in the pan or receptacle of the device and later be oxidized and thickened therein and still later be disposed therewith a material contained therein or cleaned therefrom as deemed necessary and desirable or as instructed by the manufacturer when the device should be cleaned or changed.

The venturi tube-like device also prevents surface water, rain, the like from direct forward entry into the receptacle and thereby water flooding is substantially prevented. The retained fluid is thereby not lifted and forced or flushed out onto the motor vehicular used surface below.

Another object of this invention is to have a deflecting baffle, guard, shield or having a device which is characterized by a venturi slot-like principle of construction, whereby, slush, sludge, surface water, rain water or liquid spray, paper, leaves, stones, and the like cannot, when said motor vehicle is in forward drive motion, enter directly over the front portion of a disclosed fluid impermeable pan or receptacle portion of this device and the like that are discolsed and shown in this specification and drawing. The said liquids, slush, sludge and the like would also flood, flush out or dilute the retained fluid in the pan or receptacle and thereby contaminate or create a slippery slick surface which would make motor vehicular traveling on any paved or cement covered surfaces, more dangerous. If the retained, dripped in, fluid is greatly diluted it would be easily spilled or dumped, onto a traveled surface or material which is under said motor vehicle which at times is quickly started into motion, abruptly stopped, quickly turning a sharp curve, going up or down a steep grade and the like. The above fluid mess if deposited on said the curving or steep surface would also create a dangerous and polluted surface or condition for motor vehicular travel thereon.

Still another principal object of this invention is to provide a device which is adapted or removably secured to the underside of racing cars to prevent fluid, which is or which is apt to leak therefrom and onto the surface of a testing course or the surface of a surfaced race car track. The leaking fluid would create a slippery spot, streak or area which would make it very dangerous to test, tryout, time trials or to race thereon. The device could be adapted to the underside of the racing automobile vehicle, before the race to retain or catch the leaking fluid if it should start to leak therefrom while the racer was in action on the speedway or track. This device even if adapted to or removably secured to the underside of a racing motor vehicle when there is a showing of leaking fluid would thereby eliminate a dangerous slippery surface and also will prevent the racing car from being excluded from the race, which is one of the rules for the 500 mile Memorial Day race at Indianapolis. Fluid spots would also be prevented from being unsightly on the surface of the race pits.

Still another further important object of this invention is to create or bring it to the attention of motor vehicle manufacturers, and city, state and federal authorities, that this invention is necessary, useful, needed, and essential so that the device could become standard equipment, auxiliary equipment, optional equipment, optional "extra," or an accessory thereof. Brackets, holes, flanges, or other such means to adapt or removably secure the device to and under said vehicle would be at least at the discretion of the manufacturer.

A yet another important object of this invention is to create a droughty draught of air over the material in the device, whereby, the fluid is substantially dehydrated. This is accomplished by providing and designing for the said flow of air over, under and through the material in the device as more fully disclosed in the drawings.

Still another object of this invention is to have a fluid impermeable receptacle which has a bezel-like flange, washer or dished top portion with an opening, a hole, holes or a louvered construction in a portion of said top.

The last object of this invention is to produce a fluid retaining device of the character described which may be produced and used at a minimum of expense and yet assure the highest degree of surface or material sanitation, maintenance and attractiveness that is desired upon painted surfaces, traffic lines, parking lines and the like areas used by said motor vehicles. The minimum of expense is further made possible by reusing the main structure of said device and having only the material retained in said device or only the material retained in a nestable receptacle, which is retained in said device, to be disposable or said nestable receptacle with a material therein to all be disposable. The minimum of expense is still further made possible by having a material in said receptacle that is washable and not disposable but reusable or a nestable receptacle which is reusable and the material contained therein is also washable and reusable. The minimum of expense is further yet made possible in reducing maintenance costs, by providing an arrangement and use of materials, whereby said device retains compounding portions of dripped in fluid, made possible by increasing the fluid rate of oxidation and thickening therein. The spilling, dumping and out-flowing fluid action is also thereby reduced. The minimum of expense is also still reduced because accessible bolt means, accessible bore means, accessible securing, accessible attaching, attaching or sliding means or any other accessible means which is provided on the motor vehicle for the sole purpose of permanently securing, removable fixing, and removably securing and removably attaching said device to a motor vehicle by a motor vehicle manufacturer or an individual. Additional cost for said device is saved, by use of proximate said means also, of said vehicle.

A clear support of terms and phrases used in the claims for or antecedent basis are to also be found in the description of FIGURES from 1 to 9 to the appended drawing and are to be considered as a portion of this remainder of the specification and which also contain descriptive portions to be considered as being contained in this latter detailed specification description. Description and uses, also word and phrase definitions and combinations, all of which are described by definitions and combinations, all of which are described by definitions in the beginning of this specification are also to be considered as in this portion of this specification. Whereby space and repeating of the above, and the terminology and scope of this combination invention and said definitions and the like is accomplished, especially as would become apparent or obvious to persons skilled in the art and with the above instructions and this complete application before them.

It is to be noted here that when the term, "integral," is used it is to emphasize that it is or is substantially a one piece device and any hanger, bracket or other member which is removably secured, welded, brazed, riveted, cemented and the like, which makes the member integral-like and/or removable from the receptacle portion of said device, said motor vehicle and the like. The hangers should also be considered as an integral member of said receptacle because the construction would at times be thereby greatly simplified. The device's storage and packaging made simpler and more convenient and the material costs for its manufacture also would be saved thereby. This is especially true where the device is made of metal and forming and drawing of the device is necessary. For example, moulding of the device, without the contained material in the receptacle, in one integral piece would be very feasible, whereby material costs and the like would not be excessive and especially if moulded and/or formed or drawn from plastic, a material sheet and the like.

It is also to be noted that the term "fluid impermeable" designates that the receptacle, hanger, and the like are also resistant to any fluid which is described in the former portion of this specification, wherein "fluid" is defined and is retained and contained in the receptacle after it leaks or drips from the motor vehicle.

The device of the present said tube-like invention may be more fully understood by consideration of the appended drawing together with the following description:

Figure 1:
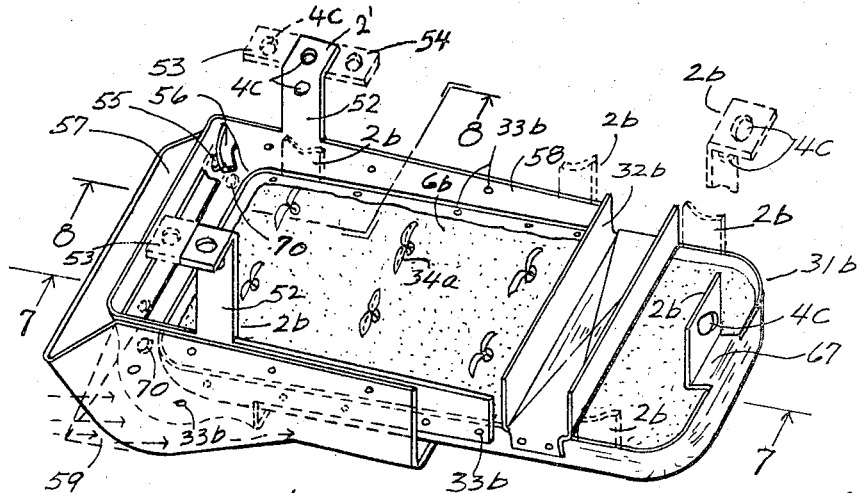
FIGURE 1 is an isometric view of a polygonal shaped device which is characterized in having a venturi tube-like air suction action when the motor vehicle is moving in forward drive.

Referring now to the drawing, there is shown in FIGURE 1 one embodiment of the venturi tube-like surface material, and health protective device, whereby receptacle 31 has the bracket 32, hanger 2 which has an opening 4. The hangers 2 are shown in dashed outline, whereby 3, or 4 of the hangers 2 can be used to removably secure the device, using accessible vehicle bolt means, suspendingly disposed to a motor vehicle. This device as shown has, an air, debris, paper, leaves, stones, surface water, water mist and the like deflecting shield 58. The shield 58 is permanently adapted or secured to the sides of receptacle 31 by spot welding 33 but can be permanently secured by cement means, heating means, adhesive means, riveting means, and the like. Receptacle 31 and shield 58 may be made of plastic material if desired or deemed necessary. Any portion or member of the device, shown in FIGURE 1 also may be made of the same material or any combination of the materials described for receptacle 1 or 31. The shield 58 to be removably secured to the sides of receptacle 31 if so desired, whereby it is removable and will thereby function the same as the device shown in FIGURE 1. The hangers 52 are shown as an integral portion of the shield 58, whereby the shield 58 must be used, with receptacle 31, and cannot be separated therefrom as previously disclosed, for the hanger 52 supporting means would not be thereon for the support of the forward portion of receptacle 31. It is to be understood that removable hanger means could also thereby be used if desired or deemed necessary. Shown is an air scoop 57 which scoops a draughting flow of air thereinto for creating a substantial air sucking or suction action on the venturi tube-like air throat, which is the space between the rearward edge of shield 58 and the bottom of receptacle 31. This sucking or suction created by a generated flow of air is known as a venturi tube or herein as a venturi tube-like action. The generated scooped air thereby creates said venturi tube-like action, and air in the described throat is sucked out and at the same time the air over the receptacle 31, or retained fluid (not shown) or material 6, also moves draughtingly thereover, and in the same direction as the motor vehicle forward drive motion. The air scoop 57 is also to be permanently or removably secured to the shield 58 if desired or deemed necessary, as will be more fully disclosed later herein. The hangers 2 or 27 (not shown) or 52 or ends 2' may have a one wing or tab 53 or a two wings or tabs 53 and 54 are to also have the slotted, keyhole, or I-shaped opening 4 if desired or deemed necessary. The wings 53 and 54 allow or permit the insertion and removal of accessible bolt 19 and the like without the need of a thin walled socket, or fear that that thickness of the hanger upstanding portion would create an interference and the like. This wing arrangement and construction, whereby the center opening is not used, provides a more solid construction because two accessible bolt means is thereby possible and used if so desired. The spacing of the holes 4 must match the accessible bolt hole means if such use is desired or other securing structure must be provided in the flange of the crankcase oil pan 14 (not shown). This wing structure also distributes the pressure, of the accessible bolt against the oil pan 14 flange gasket, over a larger area, especially if the center opening 4 is also used. The socket head bolt 20 would thereby be preferred. FIGURE 1 also shows bracket 32, material 6, and the formed over ends of the paper fastener 34, whereby the material 6 is retained in receptacle 31. Any of the material 6 retaining means disclosed can also be used in this embodiment if desired or deemed necessary. The view also shows dashed-line holes 70 through which the ends of tubing 8 are to be inserted if the tubing is used in this unique venturi tube-like characterized device. The view shows holes 55 through which a bolt 30 means are inserted as disclosed later. The material 56 is shown in a torn away view to expose the hole 55 which is covered by material 56. The material 56 is one of the fibrous, open cell foam, and the like disclosed material that material 6 is made from. Material 56 can also be an elastomer material, whereby it cushions or acts as an anti-rattling member and also acts as an air seal for preventing any direct entry of air flow into the receptacle where it contacts an upper forward portion of the crankcase oil pan 15 as shown in FIGURE 2.

Figure 2:
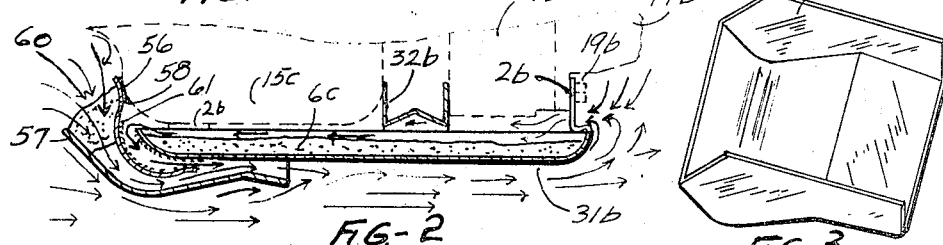
FIGURE 2 is a sectional view along line 7—7 of FIGURE 1, showing the construction and the unique venturi tube-like air flow and air suction action by arrow pointing means.

FIGURE 2 shows the draughting flow of air by arrows, whereby the air, is scooped by the curvedly shaped air scoop 57, is shielded from direct entry by the forward curvedly portion of shield 58 and flows draughtingly and suckingly on and past the, first, inner venturi tube-like air throat, and then it exits out of the exposed, second venturi tube-like air throat and blendingly into the draughting flow of air on the outer portion of the second throat. A draughting flow of air also is shown, that is draughtingly and suckingly pulling on the air which is flowing out of the second venturi air throat, and was just described. It will be noted by the air flow arrows how the air basically enters over the rear of receptacle 31, flows draughtingly in the same direction as is the motor vehicle forward drive motion, thereover the receptacle 31 and over its forward end portion where it is sucked into the first venturi throat and thereout. Bracket 32 prevents, to a substantial amount, the entry of air at that point, whereby the draughting flow of air, over the receptacle or between the material 6 and the underside of the bell housing 16 and crankcase oil pan sump 15, is not shorted out or interrupted. The material 60 is an air filter material, whereby air, moisture, water, and the like will pass therethrough and not interrupt the scooped in flow of air any more than necessary, but any large debris or foreign matter, and the like, such as leaves, paper, sticks, stones etc. will be deprived entry through, the material 60. The material 60 is retained in the mouth which is formed by air scoop 57 and may be made of a, fibrous material, curly hair material, open cell foam material (preferably of the soft resilient material such as urethane foam) glass fibers, man-made fibers, steel, copper, aluminum wool and the like. The above disclosed debris or foreign matter and the like would otherwise enter the air scoop mouth and be lodged therein, just before the first venturi or pass thereby and be lodged in the narrow portion of the second venturi, the latter being the most objectionable because this air damming action would completely prevent a draughting flow of air, over the receptacle 31, in the direction of the motor vehicle forward drive, thereby the rate of oxidation and thickening of the retained fluid, by a draughting flow of air, is substantially lost. The view of FIGURE 2 shows a bed of catalytic chemicals 61 on an alumina catalyst carrier and the like disclosed and may be used in receptacle 1 or 31. The catalytic chemicals, catalyst and catalyst carriers are to be picked from the known ones that are presently being used, tried, or mentioned for use in exhaust muffler anti-smog devices out west and the like. Hydrocarbon gases and the like would be carried off, from the retained fluid, by the draughting flow of air thereover, and be carried against catalytic chemical bed and absorbed therein, whereby the gases are partially purified and exhausted out of the last venturi tube-like, rectangular shaped and the like, air throat. Accessible bolt 19 of the transmission mounting flange means is also shown as being used.

Figure 3:
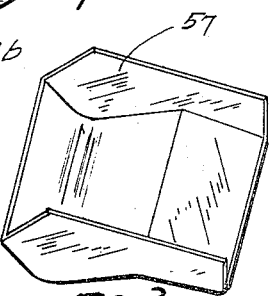
FIGURE 3 is an isometric view of the air scooping member. The scooping member aids in creating a more positive venturi tube-like draught or sucking action, on air, in the shield air throat.

FIGURE 3 shows a curvedly shaped channel 57 member, which is the air scoop removed from the device, but is used as shown in FIGURE 2. The members 57 and 58 both have upstanding sides, which are substantially flat but also could be otherwise as deemed necessary or desired.

Figures 4, 5, 6:
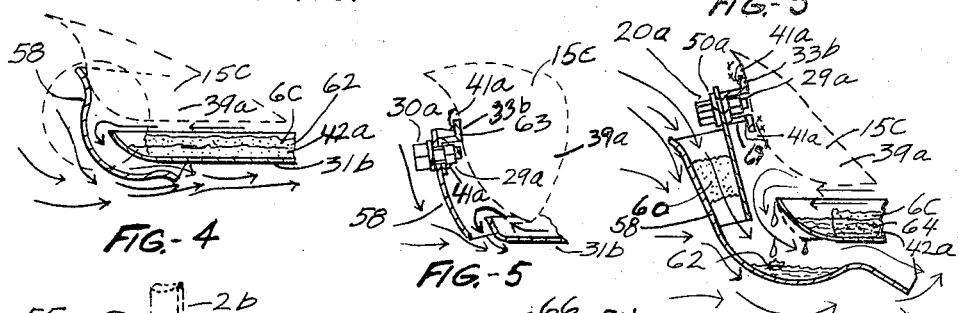
FIGURE 4 is a sectional view along line 8—8 of FIGURE 1, without the air scooping member shown as FIGURE 3. The venturi tube-like characteristic of flow of air over the material or fluid in the device is still maintained and is shown by arrow pointing means.
FIGURE 5 is an enlarged view of the circled area of FIGURE 4, showing a means of removably securing a front portion of the device to the crankcase oil pan, thereby eliminating the two front hangers and at the same time sealing off the flow of air directly into the device.
FIGURE 6 is a cross sectional view which shows more of the device than in the circled area of FIGURE 4. This figure shows still another version by which an air scooping mouth, for increasing the flow of venturi tube-like air.

FIGURE 4 shows the venturi tube-like device having only the air, water, water mist, humid atmosphere, debris, foreign matter, and the like, shield 58. If the member 56 is eliminated, as shown, then the upper portion of the shield 58 would have to be sprung snugly against, for example, the forward portion of the crankcase oil pan sump 15, in order to prevent a forced flow of air, which is shown as being deflected around the upper portion of shield 58 by arrows, from direct entry into the receptacle 31 or first venturi air throat, whereby the draughting flow of air, over the receptacle 31, in the described direction would be eliminated. The air scoop 59, shown in FIGURE 1 in dished-line outline, scoops in the greatest amount of debris, stones, leaves, paper and the like, which may pass therethrough and yet cannot enter directly into the receptacle 31, whereby, water flooding, debris and contamination of the retained fluid is eliminated. The leaves, paper and the like would also prevent a good and necessary draughting flow of air on, against, and over the retained fluid or material 6 having the retained fluid therein. The air scooping member 57 seems to be less efficient from the disclosed standpoint but is preferred because if it is rammed against a somewhat solid object, it then would be partly deflected upwardly and not caught and torn off as would be the dashed-line member 59. Referring back to FIGURE 4, it is shown that the first venturi tube-like air-throat is also still maintained, whereby the forced draughting flow of air is now acting against and past the curved lip portion of the shield 58 and air in the rectangular and the like, venturi tube-like air-throat is draughtingly and suckingly pulled thereout. The described flow of air out of the air-throat draws or sucks upon the air, over the receptacle, and movement of the air is maintained as disclosed in FIGURE 26. FIGURE 4 also shows material 6, the retained fluid 42, transmission oil pan 39 (when used thereunder), and the gradually converging venturi tube-like air-throat and the protruding, curving, lip of the lower portion of shield 58.

FIGURE 5 shows a double angled bracket 63 which has three rectilinear, integral, wall members. The bracket 63 having one of its wall members permanently secured or welded 41 to the upper forward portion of the crankcase oil pan sump 15 or the transmission oil 39 (when the device is used thereunder). The bracket 63 having at least two openings in the third wall member, the second wall member integrally connects the welded wall and the third wall, for inserting a bolt portion therethrough. A threaded nut 29 is permanently secured or welded 41 to the third wall, the side thereof that faces the crankcase oil pan 15. The opening of the nut 29 is matched with the opening in the third wall so that when the bolt 30, with a lock washer 50 (not numbered) under its head, is inserted for entry into the nut 29, all will line up and the shield upper portion, also having two openings therein for the insertion of bolt 30, is removably secured to the bracket 63. The two hangers 2 or 52 or 27 (not shown) are thereby not needed and one or two rear hangers 2, with the two forward bolt 30 means, are all that is required for removably securing the device to the motor vehicle. The view also shows, that the bottom edge portion of the shield 58 is not as curvedly shaped as in FIGURE 4 and is shorter, whereby a forced draughting flow of air is more directed at the lower edge of shield 58. This arrangement and construction of the venturi tube-like air-throat opening allows the forced, draughting, flow of air thereacross and not as tangentially as in FIGURES 1, 2 or 4. This construction and arrangement also creates a flatter device, whereby no portion of the shield 58 protrudes past the bottom wall portion of the receptacle 31 and thereby more space is between the device and the traveled surface and still has a venturi tube-like air-flow suction action. The device is of solid construction; efficiently and safely removably adapted or secured to the motor vehicle, whereby the device should never be accidentally loosened therefrom and be found loose on roads, highways, and the like so that other motor vehicles will not run over them and thereby accidentally also cause accidents. Also the material 6 should never be forced or accidentally loosened from the device and thereby found shrewn or on roads, highways and the like whereby further motor vehicle accidents and contamination of the previously described surfaces are encountered. The bracket 63 can also be welded 180 degrees to that as shown, whereby the third side will be upstanding and thereby the nut 29 can be finger-held and the flat on the nut is shouldered against the center wall portion to prevent its rotation when the bolt 30 is tightened.

FIGURE 6 shows a channel-like member, which has integrally flanged rectilinear members on the sides of the channel, and which are permanently secured or welded 41 to the forward portion of the crankcase oil pan sump 15, or oil pan 39 (when the device is removably secured thereto and thereunder). A threaded nut 29, which receives the threaded end of bolt 30 therein, is held captive in the channel portion of member 63'. Two of the flats of the nut are shouldered against the inside wall sides of the channel 63' (prime) and thereby the nut is held captive and its rotation is prevented in the channel portion. Of course, the nut can be welded therein if necessary but if its threads are ever stripped then replacement thereof would be rather difficult unless the nut is heat treated and the like. An opening on each side of the bolts 30 opening through the upper and forward wall portion only, can be prepunched or precut therein and thereby the nut 29 can be finger inserted in the openings and finger pushed in position for bolt insertion as desired, and finger or tool removal thereof would thereby be possible, in event of nut stripping and the like. The view shows the retained fluid 42, material 6 or earth 64 (as defined or any combination thereof). The socket head bolt 20 is used and preferred as described. The lock washer 50 is under the head of bolt 20 for further safety precautions. The air scoop construction is repeated herein, whereby it is another way of preforming basically the same positive venturi tube-like air scoop action. The shield has a channel-like member having sides, which are permanently secured to an inside portion of the shield 58. The shield and channel can be an integral part especially if plastic material is used and injection molding and the like is used. A safe, and solid construction must be used as previously disclosed. The draught of air enters the shield-scoop 58, flows through material 60 and draughtingly flows past a first venturi tube-like air-throat and out of the second venturi air-throat which was all previously disclosed in FIGURE 2. The retained fluid may at times have a tendency to drip from the forward portion of receptacle 31 in which case the shield-scoop 58 is curvedly formed, whereby a retained fluid pocket is formed for capturing and further retaining the dripping fluid. A bed of catalytic chemicals 62, as used in the catalytic oxidation of motor vehicle exhausts, further increases the rate of oxidation and thickening of the fluid retained in the catalytic chemical bed. A dashed-line protrusion can be thereon, as shown, for creating a fluid drip-off point.

Figure 7:
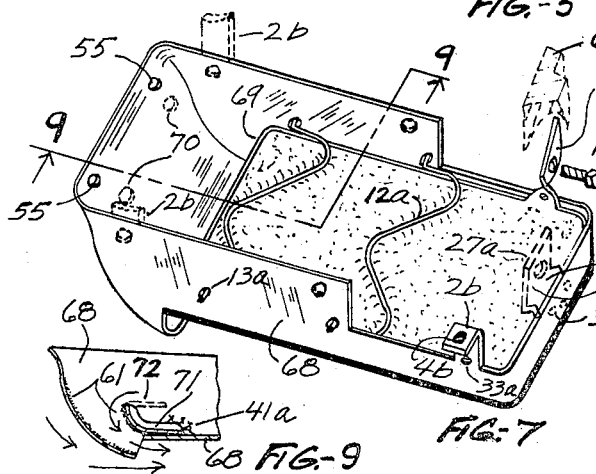
FIGURE 7 is another isometric top view of the venturi tube-like device, also shown being secured therein by wire means.

FIGURE 7 shows a device 68, which is preferred to be molded from a plastic material but may be made from any of the materials which receptacle 31 was disclosed as being made of. The view shows, the retained material 6 in receptacle 69, wire 12 retaining means, bolt 30 openings 55, tubing openings 70 (in dashed-line outline) which can be adapted or removably secured to the device 68 sides, rear hangers 2 which are shown in a choice of three styles. One rear one in offset style, there would be two of the hangers 2 having end 2' thereon, one on each side of device 68 as shown (single one). Two twisted hangers 2, one being shown, one used on each side of device side 68, in place of the hanger 2 with end 2' thereon. The view shows in dashed-line outline 66 a portion of a bell housing and why the twisting of hanger 2 would be necessary, when accessible bell housing bolt 19 means is used.

Figure 8:
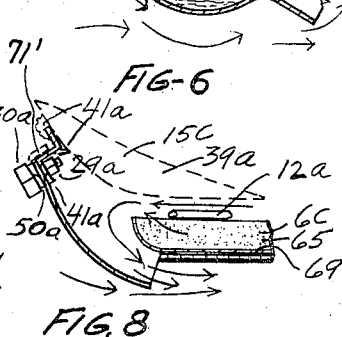
FIGURE 8 is a cross section along line 9—9 of FIGURE 7, showing the venturi tube-like flow of air and the shielding, contamination preventive proof, arrangement for the nestable receptacle contained said venturi device.

FIGURE 8 shows a material 6, which is an oil resistant open cell foam material, which is foamed in place, in the oil resistant and fluid impermeable receptacle 69. The outer wall portion, skin 69 could be the outer portion of the foam material which contacts the mold inside walls, whereby a fluid impermeable skin is integrally formed around all but the top portion of the open cell foam material 6. The top of the foam material 6 could also be sliced and the like, to expose the open cells thereon. The view also shows how the end of the receptacle 69 or material 6 helps to form part of the venturi air throat by its being partially projected beyond and over the device 68 as fully also seen in FIG. 9, edge. The receptacle 69 or material 6 can also be adhesively bonded to the substantially flat inside bottom wall portion of device 68 if desired or use wire 12 retaining means as desired or deemed necessary. The view also shows the bracket or angle member 63, as used in FIGURE 5, and how the forward shield portion of device 58 is removably secured by bolt 30, lock washer 50, and nut 29, means to angle member 63. The venturi tube-like air-throat is slightly forward and downward to that of FIGURE 5 and thereby is an inbetween design construction to the rest of the venturi tube-like devices. FIGURE 8 also shows a hook-like lip which is in dashed-line outline and overhangs on the angle member 63. With this lip thereon then only one bolt 30 would be necessary for removably securing the shield 58 to said angle member.

Figure 9:
FIGURE 9 is a cross sectional view along line 9—9 of FIGURE 7, showing an arrangement by which the interior portion of the device can be transformed into a pan-like structure of FIGURE 1 by merely sealingly adapting a small member therein.

FIGURE 9 shows the device 68 as it would look when made out of a metal material, and formed and drawn as is the crankcase oil pan 14 of a motor vehicle. The member 71 would be quite difficult to also be formed as an integral portion thereof, especially if the venturi tube-like air-throat, which is sheared, formed, and drawn downwardly, out of the device 68 bottom wall portion, as shown, and still maintain a long narrow venturi, tube-like, air exit opening. The member 71, of which a portion thereof is substantially flat and rectilinear for sealingly resting on and across the width of the device 68, substantially flat bottom wall portion. The member 71 has an integral forward member which is curvedly shaped upwards, so that the curved portion thereof will form a portion of the curving and converging venturi tube-like air-throat. The member 71 has integral, flat shaped ends thereon to facilitate the sealing, welding, cementing and the like of member 71 into the device 68, whereby the device will have an integral fluid impermeable receptacle. A bezel-like flange is shown, in dashed outline, that will retain the retained fluid therein, the now fluid impermeable receptacle, even if the motor vehicle is in a forward, out of level position, or is stopped abruptly. The flange 71 can also be in a tab form, for retaining the forward portion of a material 6 or a separate receptacle, which is nested into the device 68. The receptacle portion need not be sealed, or the substantially flat bottom wall portion of device 68 need not be solid or be fluid impermeable, if the nestable receptacle, which is oil resistant and fluid impermeable, is retained in the device 68. The said flat, bottom wall portion, of device 68 can also have an opening therethrough or openings therethrough such as perforations and the like because the nested receptacle, an example of which is shown in FIGURE 8, member 69, would completely cover the opening or openings and thereby the venturi tube-like sucking draft of air principle would not be shorted out or defeated.

This latter poriton of this specification contains further descriptive detailed materials, coatings, receptacle and device retaining means, coatings and the like which may be necessary for a more detailed specification. Fabrics which are woven and non-woven may be used for the outside wall of a fluid retaining receptacle and which are to be plastic or elastomercoated as desired or deemed necessary for creating fluid impermeability. Nylon which is coated with Buna N also makes a good barrier for the retained fluids. Elastomers such as natural rubber, SBR, polyisoprene, neoprene, silicone, hypalon, polybutadiene, butyl, polyurethane, nitrile, polysulfide, polyacrylate, fluorocarbon and the like are to be used as desired or deemed necessary for a coating, boot, sleeve, bag, coatings and the like, for the oil resistant and fluid impermeable receptacles which are reusable or disposable and are with or without bezels thereon. The separate oil retaining receptacles of this device could have an open cell foam material 6 foamed therein if so desired and loose or bonded fibers of hair, man-made metal, and the like and with oil resistant, elastomer or plastic material as a binder.

Strapping of the fluid impermeable receptacles in, on or to a supporting structure may be made mostly by use of flat steel, flat fabric, round steel, etc. which are twisted, crimped, spot welded, punch the ends together, metal clips, buckles, etc. Rope twine, pressure-sensitive tape, reinforced tape, rayon, nylon, and other non-metal materials can also be used. A material called Dymax is also very desired or as deemed necessary for it has a molecular structure which is oriented to combine unusually high strength with resilience and it resists oils, greases, etc. which is very desired. A sta-strap which is installed by hand or with a tool, called Sta-Strap Tool is also used if desired.

A new method of cold fusing metal corners is also to be used in the construction of this device if desired or deemed necessary, whereby the top of the corner is bezeled, spot welded, and then the metal corners are coined into a fluid impermeable and strong joint. This replaces, gas welding, etc. of the receptacle or device corners. The above is an example only and other constructions of coining the corners of the receptacle or the device may be used. Some of the thermoplastics that are to be used as desired may be found useful in this invention are ABC plastic, acetal resins, acrylics, cellulosics, chlorinated polyethers, fluorocarbons, polyaminds (nylon), polyethylene resins, polycarbonates, polypropylenes, styrene polymers and copolymers, vinyls and the like. Thermosetting plastics are alkyds, allylics, aminos, epoxy resins, phenolics, polyesters, silicones, urethanes, glass reinforced epoxies, vulcanized fibre, molded fiber glass reinforced plastic and the like disclosed previously and need not be repeated and are known to the persons skilled in the art. Low-pressure laminating and the like are also to be considered for the construction of the receptacles. Some of the open-cell foam material 6 is made from latex rubber, polyvinyl, polyether urethane, polyurethane, chloride, polyester, polyepoxies, vinyl, phenolic, polyolefin, silicone, and the like which are or can be rigid or semi-rigid or flexible or super soft and used as desired or deemed necessary, depending upon the material used. A synthetic elastomer or an elastomer sprayed on outer coating or a shell, boat, sleeve, made from the elastomers disclosed above and the like can be used. A coating called Hypalon is also to be used if desired or deemed necessary. Since glass fibers are the fastest growing, and their applications are almost entirely industrial and are oil resistant and heat resistant whereby they are preferred. Other fibers which can be used are asbestos, sisal, cotton, jute, man-made and metallic fibers. The resin used are preferred to be polyesters but epoxies phenolics and silicones are also to be considered as desired or deemed necessary.

A fabric receptacle which is made fluid impermeable by hand nesting a film or sheet of material therein or a preformed, film, receptacle for retaining the leaked fluid therein. Some of these films or sheets are, cellophane, polyethylene, polyester, polypropylene, polyvinylidene chloride (designated hereafter as PC) and polyurethane, which can be laminated to other thermoplastics and vacuum formed to create oil resistance if necessary is very good for vacuum forming of a receptacle. Laminations of PC-chloride nylon, and polyester films are also to be used as desired. The combination of a polymer coating with a polyester sheet is also very desirable for an oil resistant and fluid impermeable receptacle for the retained fluid. Polycarbonates coated with polyethene or PC-chloride is also good and is to be considered if desired.

High impact polystyrene coated with an oil resistant coating, high density polyethylene, impact polypropylene, cellulose-acetate-butyrate, acrylonitrite-butadiene-styrene (coated as disclosed) polyester glass-fiber, a thermosetting monomer, and the like are also to be considered for making the device as desired or deemed necessary.

It was disclosed that a system consisting of a nutrient solution containing a nitrogen source, $NH_4NO_2$ or $NH_4SO$, buffer salt and traces of heavy metals, and the bacteria (hydro-carbon consuming) isolated from ordinary garden soil and oil, the retained fluid would be oxidized very rapidly. Cultures capable of attacking crude oil, lubricating oils, vaseline, asphalt, and other petroleum fractions used are obtained from garden soil. Light weight medium-weight fractions are more subject to attack than heavy viscous portions and paraffinic fractions are more readily broken down than the aromatic types. Water, moisture and the like would thereby thin out the consistency of the retained fluid and also float it on its surface, whereby the bacteria will attach the floating retained fluid which is now on a large, dispersed surface. It also is known that the breakdown of an oil is an oxidative change, characterized by a high bacterial count, emulsification and high pH. The bacteria do not exhibit a specific ability to attack one type of retained fluid or oil but rather a capacity to adapt themselves, according to conditions, to attack the particular fluid or oil that is present in the retained fluid receptacle or material retained therein because they are characterized by the ability to subsist upon various hydrocarbons as a sole source of organic matter in their diet. Because of the enormous metabolic activities of the soil bacteria alone, it would require them only a few years to convert the earth into a single vast hydrocarbon sea, if the hydrocarbon-utilizing microbes were not active, or if they decreased their activities by an appreciable amount. The single species of bacteria and the hydrocarbons utilized are too vast to mention here, but reference can be made to a book written by Ernest Beerstecher, Jr., entitled "Petroleum Microbiology," and reference to Tables 19, 20, 21, and the like, therein is only necessary to fully show what is considered as also covered by this specification or invention as desired or if deemed necessary for such reference is known to persons skilled in the art.

One of the methods of this invention is having a bed of catalytic chemicals contained in the pan or imbue or imbuement catalysts into the pan material or the material retained therein.

A motor vehicular generated draught of air will absorb or drive off the fumes which are or may be over the fluid; provide the fluid with oxygen to accelerate fluid oxidation and create a draughty atmosphere over said material. Thereby, volatile acids or fluids are also removed, reducing the volume and increasing the thickening or viscosity of the fluid retained in and under the retained material. This air action also reduces maintenance cost and increases the fluid retaining life of the retained material and prevents the fluid from spilling from the device, when said vehicle is steeply inclined or reclined. The retained material also helps to retain the thickened fluid, which is disposable along with the retained material, as may be necessary.

The spilling, dumping or ejecting retained fluid action, if allowed to happen, would cause a disguistful sight, pollute, contaminate or impair the surface or material thereunder being the surface onto which the motor vehicle is in drive. If the volume or the rate of oxidation and thickening of the fluid was not executed, in the device, then any fast action of starting or abrupt stopping may spill or dump the retained fluid onto the surface under the motor vehicle. The surface or material thereunder, for example, may be a road, street, highway and the like that would be polluted, contaminated, impaired or create a hazardous slippery surface to travel thereon. If water or other solution were to be retained in the device, along with the fluid therein. Also the above solution would be of a greater volume and a thinner consistency, which would still be more easily spilled or dumped therefrom, if the fluid was not subjected to a draught of air and/or catalyzed oxidation as herein described, to thereby help reduce the retained fluid volume.

The following are most of the mechanisms, part or parts or any combination thereof which said device may be used thereunder. The crankcase oil pan, crankcase oil pan sump, transmission, transmission oil pan, differential, clutch, transmission case and extension, fuel pump, crankcase breather pipe, valve cover breather pipe, torque converter, cross member, bell housing, overdrive unit and the like having possible fluid drip off points.

Ninety percent of the urban Americans live in localities with polluted air, but only half of all these people are served by local air pollution control programs. It is unmistakably clear that air pollution is associated with important respiratory diseases, such as lung cancer, emphysema, chronic bronchitis, and asthma, but progress or no program is effective if not backed by the public, whereby the Surface, Material and Health Protective Device is needed as was disclosed in the objects in this application.

When hydrocarbons, oxides of nitrogen and the like are emitted from the dripped fluid which is on a hot, sun-heated surface, or is exposed to the hot sunlight, a photochemical reaction produces irritants and haze. When these by products are retained in an area by climatic conditions or topographical barriers the concentrations of irritants can produce severe discomfort. Los Angeles basin has all the necessary ingredients to produce such conditions about 100 days per year.

The polygonal, rectangular, square, round, troughty, triangular, or other polygonal configurations of the receptacle's shape and the like are and will be apparent to those skilled in the art once this invention is disclosed to them and also of its importance and need of by all, as mentioned in the objects. The receptacles are to have square, rounding, sharp, blunt, and the like shape, which merge the rectilinear, curvilinear or other suitable corners, bends, and the like portions of as desired.

In this time period of ever-increasing vehicular drive and high-speed traveling, whereby an ever-increasing amount of vehicles are estimated (101,000,000) to be on the highways, thruways, freeways, turnpikes, streets, roads and the like, by 1972. This is an indicator to provide safer, cleaner and uncontaminated surface on which all persons must travel and this is a basis for this very needed inevntion and which a lot of persons wished that they had on their motor vehicles.

While several embodiments of this invention have been disclosed, it is understood that the inventive idea may be carried out in a number of ways falling within the scope of the appended claims.

Having described my invention, I claim:

1. Means for collecting and retaining fluid drippings from a motor vehicle comprising: an open topped venturi tube-like fluid impermeable receptacle device having a bottom wall and integral upwardly extending side portions that merge into corner potrions which integrally connect adjacent side portions together and having means which are removably secured to said vehicle by a means for suspendingly disposing at least one inside bottom wall of the receptacle portion of said deivce under at least one portion of said vehicle:

(b) said inside bottom wall portion being in spaced associated relationship under at least one fluid drip off point for said fluid drippings; and (c) at least one portion of a venturi tube-like shield means arranged in sapced realtion to at least one wall portion of said receptacle and at least one upper portion of said shield means being substantially adjacent to at least one portion of said vehicle, said shield means substantially preventing at least one portion of a motor vehicle generated draft of rearward air flow above said receptacle by having said rearward generated air flow substantially against at least outer wall portion of said shield, said generated air being created by the forward drive motion of said vehicle for drawing a draft of air substantially forward over at least one upper inside portion of said receptacle to prevent substantially any portion of said retained fluid from being forced out of said receptacle by direct forward entry of foreign matter into and over the forward wall portion of said receptacle when said vehicle is in forward drive motion.

2. The collecting and fluid retaining receptacle means of claim 1 wherein said shield means having additionally at least one portion of an air scooping means in spaced relation to at least one portion of said shield means, said scooping means being in spaced relationship from a forward edge portion of said shield means by a predetermined distance and also being spaced from an edge of said shield means by a second predetermined distance to provide a greater and a more directed forced draft of air rearwardly and suckingly past at least one portion of said tube-like opening means in response to said forward drive motion of said vehicle.

3. The collecting and fluid retaining receptacle means of claim 2 including filter means arranged in the forward scoop-like opening of said scoop means, whereby foreign matter is substantially filtered out to prevent blockage of said scoop-like opening.

4. The collecting and fluid retaining receptacle means of claim 1 wherein said receptacle, said securing means, and said shield means are integrally constructed together.

5. The collecting and fluid retaining receptacle means of claim 1 wherein at least one portion of said receptacle is suspendingly disposed under at least one portion of a crankcase oil pan sump of said motor vehicle.

6. The collecting and fluid retaining receptacle means of claim 1 wherein at least one portion of said receptacle is suspendingly disposed under at least one portion of a crankcase oil pan sump and under at least one portion of a bell housing of said vehicle.

7. The collecting and fluid retaining receptacle means of claim 1 wherein at least one portion of said receptacle is suspendingly disposed under at least one portion of a crankcase oil pan sump, bell housing and transmission of said motor vehicle.

8. The collecting and fluid retaining receptacle means of claim 1 wherein at least one portion of said receptacle is suspendingly disposed under at least one portion of the bell housing and the transmission of said vehicle.

9. The collecting and fluid retaining receptacle means of claim 1 wherein at least one portion of said receptacle is suspendingly disposed under at least one portion of the bell housing of said motor vehicle.

10. The collecting and fluid retaining receptacle means of claim 1 wherein at least one portion of said receptacle is suspendingly disposed under at least one portion of the transmission oil pan of said motor vehicle.

11. The collecting and fluid retaining receptacle means of claim 1 wherein at least one portion of said receptacle is suspendingly disposed under at least one portion of the bell housing and transmission oil pan of said motor vehicle.

12. The collecting and fluid retaining receptacle means of claim 1 wherein at least one portion of said receptacle is suspendingly disposed under at least one portion of the crankcase oil pan sump, bell housing, and tranmission oil pan.

13. The collecting and fluid retaining receptacle means of claim 1 wherein said receptacle has a fluid absorbing material retained therein.

14. The collecting and fluid retaining receptacle means of claim 1 wherein said receptacle has an air filter type of material retained therein.

15. The collecting and fluid retaining receptacle means of claim 1 wherein said receptacle has an open cell foam material retained therein.

16. The collecting and fluid retaining receptacle means of claim 1 wherein said receptacle has a material which has at least one portion thereof partitioned.

17. The collecting and fluid retaining receptacle means of claim 1 wherein said receptacle has an earth material retained therein.

18. The collecting and fluid retaining receptacle means of claim 17 wherein said material is fuller's earth.

19. The collecting and fluid retaining receptacle means of claim 1 wherein said receptacle has a cellulosic material retained therein.

20. The collecting and fluid retaining receptacle means of claim 1 wherein said receptacle has a porous material retained therein.

References Cited

UNITED STATES PATENTS

| | | | |
|---|---|---|---|
| 1,163,317 | 12/1915 | Brush | 180—69.1 |
| 1,443,310 | 2/1923 | Fishburn | 180—69.1 |
| 1,865,081 | 6/1932 | Chappel et al. | 208—4 |
| 1,983,672 | 12/1934 | Labarthe et al. | 208—3 X |
| 2,061,687 | 11/1935 | Wilkoff | 208—3 |
| 2,396,900 | 3/1946 | Taggart | 208—3 X |
| 2,783,848 | 3/1957 | Beskid | 180—69.1 |
| 2,841,245 | 7/1958 | Colgan. | |
| 2,931,453 | 4/1960 | Inglese | 180—69.1 |

BENJAMIN HERSH, Primary Examiner

M. L. SMITH, Assistant Examiner